United States Patent
Iwasaki

(10) Patent No.: US 9,956,750 B2
(45) Date of Patent: May 1, 2018

(54) TISSUE PAPER AND METHOD OF PRODUCING TISSUE PAPER

(75) Inventor: Minoru Iwasaki, Fujinomiya (JP)

(73) Assignee: DAIO PAPER CORPORATION, Ehime (JP)

( * ) Notice: Subject to any disclaimer, the term of this patent is extended or adjusted under 35 U.S.C. 154(b) by 0 days. days.

(21) Appl. No.: 13/807,532

(22) PCT Filed: Aug. 2, 2010

(86) PCT No.: PCT/JP2010/063006
§ 371 (c)(1),
(2), (4) Date: Dec. 28, 2012

(87) PCT Pub. No.: WO2012/001822
PCT Pub. Date: Jan. 5, 2012

(65) Prior Publication Data
US 2013/0101817 A1    Apr. 25, 2013

(30) Foreign Application Priority Data

Jun. 30, 2010    (JP) .................................. 2010-149655

(51) Int. Cl.
| | |
|---|---|
| *B32B 29/00* | (2006.01) |
| *D21H 27/02* | (2006.01) |
| *D21H 27/00* | (2006.01) |
| *D21H 19/84* | (2006.01) |

(Continued)

(52) U.S. Cl.
CPC ........... *B32B 29/005* (2013.01); *D21H 19/00* (2013.01); *D21H 19/84* (2013.01); *D21H 27/002* (2013.01);

(Continued)

(58) Field of Classification Search
CPC .... D21H 27/002–27/008; D21H 27/30–27/42; D21H 1/02; D21H 25/02;

(Continued)

(56) References Cited

U.S. PATENT DOCUMENTS

| | | | | |
|---|---|---|---|---|
| 2004/0112783 | A1* | 6/2004 | Mukai | ..................... A47K 10/16 206/494 |
| 2005/0077020 | A1* | 4/2005 | Hirasawa | ...................... 162/135 |

(Continued)

FOREIGN PATENT DOCUMENTS

| | | |
|---|---|---|
| EP | 1464263 A1 | 10/2004 |
| EP | 2520206 A1 | 11/2012 |

(Continued)

OTHER PUBLICATIONS

European Search Report of Patent Application No. 10854119.4 dated Feb. 25, 2015, 6 pages, European Patent Office.

*Primary Examiner* — Samir Shah
*Assistant Examiner* — Jasper Saberi
(74) *Attorney, Agent, or Firm* — Renner, Kenner; Arthur M. Reginelli

(57) ABSTRACT

Provided is tissue paper which has softness, smoothness, and moistness either equaling or surpassing those of the existing moisturizing tissue paper and which is also less sticky and is not easily torn in use. The two-ply chemicals applied tissue paper has a configuration in which the amount of the chemicals applied on both side surfaces is 2.0 to 5.5 g/m², the basis weight per each layer of sheets constituting the two-ply chemicals applied tissue paper is 10 to 25 mg/m², and the thickness of the two-ply chemicals applied tissue paper is 100 to 140 μm.

11 Claims, 15 Drawing Sheets

(51) Int. Cl.
*D21H 27/30* (2006.01)
*D21H 19/00* (2006.01)

(52) U.S. Cl.
CPC ......... *D21H 27/004* (2013.01); *D21H 27/005* (2013.01); *D21H 27/02* (2013.01); *D21H 27/30* (2013.01); *B32B 2250/26* (2013.01); *Y10T 428/24942* (2015.01)

(58) Field of Classification Search
CPC ................... D21H 19/84; D21H 19/00; D21H 7/30–7/42; D21H 7/002–7/008; B32B 29/005; B32B 2250/26; Y10T 428/24942
See application file for complete search history.

(56) References Cited

U.S. PATENT DOCUMENTS

| | | | |
|---|---|---|---|
| 2005/0238700 A1* | 10/2005 | Kleinwaechter | A61K 8/0208 424/443 |
| 2006/0243405 A1* | 11/2006 | Zwick | D21H 21/22 162/135 |
| 2008/0041545 A1 | 2/2008 | Hirasawa | |
| 2008/0075760 A1* | 3/2008 | Suzuki | A61K 8/0208 424/443 |
| 2009/0008052 A1* | 1/2009 | Konuma | D21H 19/10 162/175 |
| 2011/0024066 A1* | 2/2011 | Matsumura | A47K 10/16 162/158 |

FOREIGN PATENT DOCUMENTS

| | | | |
|---|---|---|---|
| JP | 04-009121 | | 1/1992 |
| JP | 2004-218151 | | 8/2004 |
| JP | 2005-113368 | | 4/2005 |
| JP | 2005113368 A | * | 4/2005 |
| JP | 2007-143764 | | 6/2007 |
| JP | 2008-183127 | | 8/2008 |
| JP | 2008183127 A | * | 8/2008 |
| WO | 2011080940 A1 | | 7/2011 |

\* cited by examiner (a)

(b)

(a)

(b)

TISSUE PAPER AND METHOD OF PRODUCING TISSUE PAPER

This application is the national-stage application of International Application Serial No. PCT/JP2010/063006, filed on Aug. 2, 2010, which claims priority from Japanese Patent Application Serial No. JP2010-149655, filed on Jun. 30, 2012, which are incorporated herein by reference.

TECHNICAL FIELD

The present invention relates to tissue paper and a method of manufacturing tissue paper.

BACKGROUND ART

Tissue paper in a domestic market is largely classified into a non-moisturizing tissue and a moisturizing tissue. Here, the moisturizing tissue is a tissue which is manufactured by applying a moisturizing agent such as glycerin onto made tissue base paper, and the non-moisturizing tissue is a general tissue which is manufactured without applying a moisturizing agent on tissue base paper.

The tissue paper is mainly used by a person for a facial purpose, and the moisturizing tissue is manufactured at the product specification for nose blowing.

Hitherto, the tissue paper has been used for a facial purpose for nose blowing. For this reason, there have been a number of attempts so far in order to pursue a satisfactory sensation of touch, and hence the quality has been improved. For example, the softness or the smoothness of the paper has been improved by the techniques of improving flexibility of a product by adding various types of softener into a raw material, of using a large amount of flexible fiber having low fiber coarseness, of forming delicate creping through the adjustment in adhesion and doctor blade contact when drying wet paper by a dryer, of improving a surface property by a calender, and of adjusting freeness of a raw material to be low while maintaining a transverse strength through the adjustment of a ratio between a raw material injecting speed and a speed of a net portion.

However, there is a technical limit in the non-moisturizing tissue in order to further improve the quality, and there has been an increase in the number of patients having pollen allergy or allergic rhinitis. For this reason, the moisturizing tissue is developed and currently occupies a part of the tissue market.

A heavy user having pollen allergy or allergic rhinitis blows his/her nose several tens of times every day, and has a slight inflammation due to a friction of the nose and the periphery thereof against the tissue. Accordingly, the user may easily feel a red and burning bruise. For this reason, such a user may desirably use a tissue having a low-friction surface, that is, a smooth surface. The moisturizing tissue applies moisturizing lotion chemicals including a moisturizing agent such as glycerin having an absorbing property onto baser paper of sanitary thin paper. The moisturizing tissue applied by glycerin has a low irritant property so that it may be used in cosmetics, absorbs moisture so as to moisturize the tissue, forms a smooth and thin film on the surface of the tissue, and is noticeably flexible compared to the general tissue which is not applied by glycerin. Accordingly, the moisturizing tissue is recognized as a different product having a smooth sensation of touch. For example, a technique of applying an oily material and a moisturizing agent from the outside is introduced (Patent Document 1).

The moisturizing tissue is recognized in this way and the consumption amount increases. However, in the heavy users of the moisturizing tissue, some users may dislike a sensation of stickiness due to the moisturizing agent remaining on the skin after blowing his/her nose. With regard to the sensation of stickiness, as in Patent Document 2, there is known a method of improving the sensation of stickiness by changing a chemical agent composition through the mixing of organic and inorganic powders.

However, the existing moisturizing tissue has the sensation of moisture, softness, and smoothness which are original properties thereof, and the paper strength is not strong compared to the thickness due to the water absorbing property thereof. For this reason, there is a problem in that the moisturizing tissue may be easily torn when strongly blowing his/her nose or wiping his/her adhesive snot adhering to the skin. Further, in the existing moisturizing tissue, there has not been introduced a product which reduces the sensation of stickiness caused by the sensation of moisture, softness, and smoothness which are original properties thereof and sufficiently solves the tearability.

CITATION LIST

Patent Literature

Patent Literature 1: JP 4-9121 A
Patent Literature 2: JP 2007-143764 A

SUMMARY OF INVENTION

Technical Problem

It is an object of the invention to provide tissue paper which has softness, smoothness, and moistness either equaling or surpassing those of existing moisturizing tissue paper and reduces a sensation of stickiness and tearability in use.

Solution to Problem

The invention which solves the above-described problems is as below.

Two-ply tissue paper of which a surface is applied by chemicals, wherein a chemical agent content in both surfaces is 2.0 to 5.5 $g/m^2$, a basis weight per each layer of sheets constituting the two-ply tissue paper is 10 to 25 $g/m^2$, and a sheet thickness of the two-ply tissue paper is 100 to 140 μm.

The tissue paper according to claim 1, wherein a moisture content of the chemicals 1 to 15 wt %.

The tissue paper according to claim 1, wherein a moisture ratio is 10.0 to 13.0%.

The tissue paper according to claim 1, wherein a static friction coefficient of the surface is 0.50 to 0.65.

The tissue paper according to claim 1, wherein a dry tensile strength of the two-ply tissue paper in the CD direction is 80 to 120 cN/25 mm and a wet tensile strength of the two-ply tissue paper in the CD direction is 33 to 60 cN/25 mm.

The tissue paper according to claim 1, wherein softness is 1.1 to 1.7 cN/100 mm.

A method of manufacturing two-ply tissue paper of which a surface is applied by chemicals, wherein the chemicals are applied so that a chemical agent content in both side surfaces becomes 2.0 to 5.5 $g/m^2$, a basis weight per each layer of sheets constituting the two-ply tissue paper is 10 to 25 g/m², and a sheet thickness of the two-ply tissue paper is 100 to 140 μm.

Advantageous Effects of Invention

When the chemicals having a specific amount of moisture are applied on the sheet constituting the two-ply tissue paper so as to permeate thereinto, the crepe structure of the sheet is expanded, so that the tissue paper having a smooth surface is formed. Further, since the sheet thickness decreases and the fiber density increases with the expansion, the strength between the fibers increases, so that the tissue paper having a high tensile strength, and particularly, a high wet tensile strength in the CD direction may be obtained. In the existing moisturizing tissue, the lotion chemicals are applied on the thick base paper and film is formed on the surface of the tissue so that the user feels smoothness. On the contrary, in the invention, the thickness and the amount of applied chemicals are suppressed and the crepe structure is expanded so as to smoothen the surface thereof, thereby obtaining the smoothness either equaling or surpassing that of the existing moisturizing tissue. That is, the sensation of stickiness is reduced by using a minimum amount of the lotion chemicals film on the surface of the tissue that may cause the sensation of smoothness. For this reason, even when the dried chemical agent content is smaller than that of the existing lotion type tissue paper and the sensation of stickiness in use does not easily occur, the tissue has sufficient moistness and moisture-retaining property since a sufficient amount of the chemical agent that exhibits the effect is contained in the tissue. Further, since the sheet thickness is thin, the user feels smoothness for the chemical agent content.

With the above-described configuration, the invention provides the tissue paper which has a sensation of softness and smoothness as either equaling or surpassing those of the existing moisturizing tissue, reduces the sensation of stickiness compared to the existing moisturizing tissue, and has the high tensile strength in the CD direction.

DESCRIPTION OF EMBODIMENTS

Figure 1:
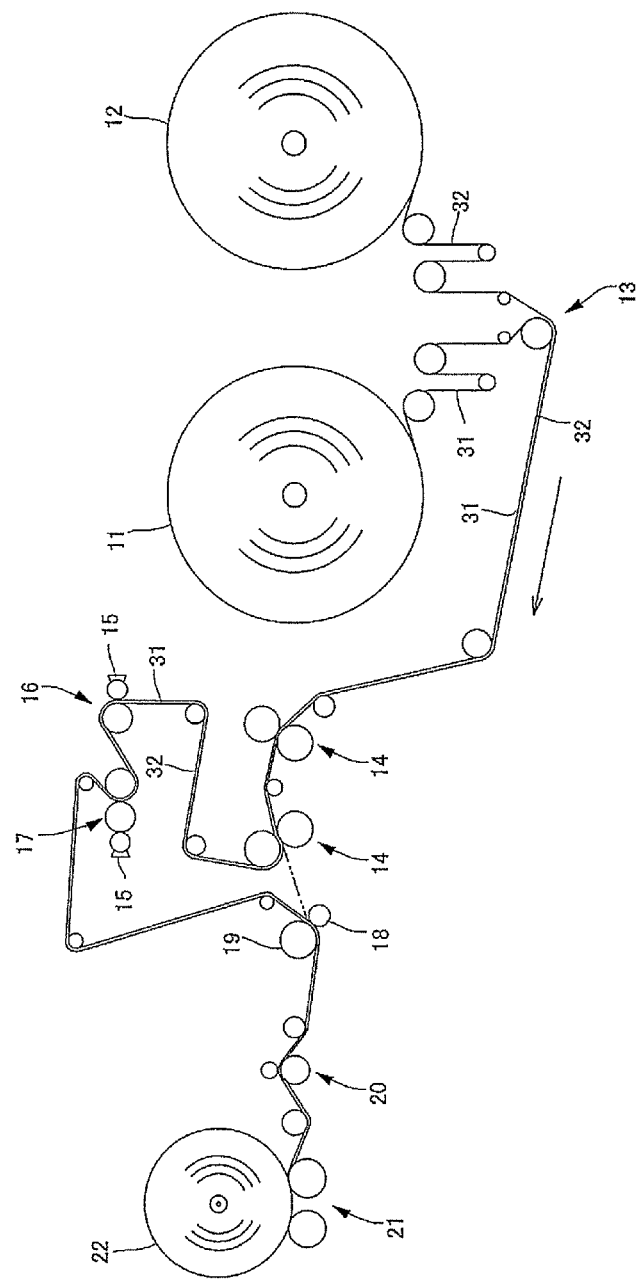
FIG. 1 is a diagram illustrating an outline of an apparatus which performs a tissue paper ply step of a first embodiment according to the invention.

Hereinafter, embodiments of the invention will be described in detail. Furthermore, a "chemical agent content" of the invention indicates a content of a dried (absolutely dried) chemical agent which is included in a unit area of tissue paper in a standard state of JIS P 8111, and specifically indicates a content of a component other than moisture in applied chemicals.

Structure Example

A base sheet of tissue paper according to the invention has a ply structure in which two pieces of thin paper (hereinafter, referred to as also sheets) are multi-ply formed.

(Thin Paper)

On the other hand, as the raw material pulp of the thin paper (the sheet) constituting the tissue paper according to the invention, for example, mechanical pulp such as ground wood pulp (GP), pressurized ground wood pulp (PGW), and thermomechanical pulp (TMP); chemical pulp such as semi-chemical pulp (CP), high-yield Nadelholz unbleached kraft pulp (HNKP), Nadelholz bleached kraft pulp (NBKP), Laubholz bleached kraft pulp (HNKP), Laubholz bleached unbleached kraft pulp (LUKP), and Laubholz bleached kraft pulp (LBKP); and recycled pulp such as deinked pulp (DIP) and waste pulp (WP) may be exemplified. One or two types or more of the raw material pulp may be selected in use. Preferably, chemical pulp which does not include a filler content or a foreign material is desirable. Further, the raw material pulp may include herbs and woody plants such as straw pulp, bamboo pulp, and kenaf pulp.

In particular, the raw material pulp is desirably obtained by mixing NBKP with LBKP. Appropriate recycled pulp may be also mixed, but in consideration of the sensation of touch and the like, only the mixture of NBKP and LBKP is desirable. In this case, the mixing ratio may be NBKP:LBKP=20:80 to 80:20, and particularly, the mixing ratio of NBKP:LBKP=30:70 to 60:40 is desirable.

On the other hand, as the other fiber raw materials, a paper raw material may include chemical fiber such as polyester-based fiber such as polyethylene terephthalate, polybutylene terephthalate, and copolymer of these, polyolefin-based fiber such as polyethylene, polypropylene, and polystyrene, acrylic fiber such as polyacrylonitrile and modacrylic, polyamide-based fiber such as Nylon 6, Nylon 66, and Nylon 12, synthetic fiber such as polyvinyl alcohol fiber, polyvinylidene chloride fiber, polyvinyl chloride fiber, and urethan fiber, semisynthetic fiber such as triacetate fiber and diacetate fiber, recycled cellulosic-based fiber such as viscose rayon, cuprammonium rayon, polynosic rayon, and lyocell and recycled fiber obtained by spinning a solution of collagen, alginic acid, chitin, and the like. Polymer constituting chemical fiber may be also homopolymer, modified polymer, blend, copolymer, and the like.

As a raw material such as pulp fiber, for example, base paper is obtained through an existing paper making process, and specifically, a wire part, a press part, a dryer part, a size press, a calender part, and the like. When manufacturing paper, for example, appropriate chemicals such as a dry paper strengthening force enhancing agent, a wet paper strengthening force enhancing agent, a softening agent, a removing agent, a coating agent, a thickening agent (paste), a pH adjusting agent such as caustic soda, an antifoam agent, and dye may be added.

(Basis Weight)

As for the basis weight per each layer of the sheets of the tissue paper according to the invention, the basis weight is desirably 10 to 25 g/m$^2$, and is more desirably 11 to 16 g/m$^2$. It is desirable that the basis weight is less than 10 g/m$^2$ from the view point of the improvement in softness, but it is difficult to appropriately ensure the sufficient strength for use. On the contrary, when the square meter basis weight exceeds 25 g/m$^2$, the entire paper is hardened and the sensation of stiffness is generated, so that the sensation of touch becomes unsatisfactory. Furthermore, basis weight is measured according to the square meter basis weight measurement method of JIS P 8124 (1998).

(Crepe Ratio)

A crepe ratio of a primary paper roll sheet that constitutes the tissue paper of the invention is set to 10 to 30% and more desirably, 13 to 20%. Here, the crepe ratio is expressed by the following equation.

Crepe ratio:{(circumferential velocity of dryer when manufacturing paper)−(reel circumferential velocity)}/(circumferential velocity of dryer when manufacturing paper)×100.

(Chemicals)

The tissue paper of the invention contains a chemical agent of 2.0 to 5.5 g/m$^2$ and more desirably, 3.0 to 5.0 g/m$^2$ totally in both side surfaces. When the chemical agent content is less than 2.0 g/m$^2$, the effect of the chemical agent is not exhibited. Further, when the chemical agent content exceeds 5.5 g/m$^2$, the sensation of stickiness is generated in the tissue paper and the wet paper strengthening force is degraded.

With regard to the chemicals to be applied, the viscosity is set to 1 to 700 mPa·s at 40° C. from the viewpoint of high-speed processing. More desirably, the viscosity is set to 50 to 400 mPa·s). When the viscosity is smaller than 1 mPa·s, the chemicals easily scatters from a roll such as anilox roll, press plate roll, and gravure roll. In contrast, when the viscosity is larger than 700 mPa·s, it is difficult to control the chemicals application amount to each roll or the continuous sheet. As the constituents, polyol is contained by 70 to 90%, moisture is contained by 1 to 15%, and a functional medical agent is contained by 0.01 to 22%. The amount of the moisture of the chemicals to be applied is obtained by the Karl Fischer's method.

Polyol includes polyalcohol such as glycerin, diglycerin, propylene glycol, 1, 3-butylene glycol, polyethylene glycol, and derivative thereof, and includes saccharides such as sorbitol, glucose, xylitol, maltose, maltitol, mannitol, and trehalose.

As the functional medical agent, a softening agent, a surfactant, inorganic and organic particulate powder, an oily constituent, and the like may be exemplified. The softening agent and the surfactant are effective for softening the tissue or smoothening the surface thereof, and adopt an anionic surfactant, a cationic surfactant, and an amphoteric ion surfactant. The inorganic and organic particulate powder makes the surface soft. The oily constituent serves to improve the lubricating property, and may adopt higher alcohol such as liquid paraffin, cetanol, stearyl alcohol, and oleyl alcohol.

Further, as the functional medical agent, a moisturizing agent having an arbitrary combination of one or more of hydrophilic polymer gelling agent, collagen, hydrolytic collagen, hydrolytic keratin, hydrolytic silk, hyaluronic acid or salt thereof, ceramide, and the like may be added as a medical agent which helps or maintains the moisture-retaining property of polyol.

Further, as the functional medical agent, aroma chemical, an emollient agent such as various natural essences, vitamins, an emulsifying agent which stabilizes mixed constituents, an antifoaming agent which suppresses foaming of chemicals so as to stabilize chemicals application, mycostat, and a freshener such as organic acid may be appropriately mixed. Further, an antioxidant agent of vitamin C and vitamin E may be contained.

Among the constituents, it is desirable to use polyalcohol such as glycerin and propylene glycol as a main constituent from the viewpoint in which the viscosity of the chemicals and the chemicals application amount are stabilized.

The chemicals are applied at the temperature of 30° C. to 60° C. and desirably 35° C. to 55° C.

(Chemicals Application Amount)

A chemicals application amount was calculated by a difference between basis weight of each sheet when the chemicals are not applied after the ply process in operation and that of each sheet immediately after the corresponding chemicals application.

(Chemicals application amount g/m$^2$)=(basis weight g/m$^2$ immediately after application)−(basis weight g/m$^2$ without application)

The sum of the amounts of chemicals applied on both outer surface layers, amounts thereof on both side surfaces indicates the sum of the amounts thereof per each unit area of the sheet of the plied tissue paper, and is obtained by adding the amounts thereof on the respective sheets.

(Chemical Agent Content)

The amount of applied chemical agent indicates the content of the dried (absolutely dried) chemical agent contained in the unit area of the tissue paper in the standard conditions of JIS P 8111 (1998), and specifically, indicates the content of the component other than the moisture in the applied chemicals. The unit area of the tissue paper indicates the area when a plied sheet is seen from a point in a line perpendicular to the plane of the piled sheet, and does not indicate the total area of the respective plied sheets and the front and rear surfaces thereof.

(Chemical Agent Content Ratio)

The chemical agent content ratio indicates a ratio (%) obtained by dividing (B) by (A), where a tissue paper product having a predetermined mass and moisturized under the condition of JIS P 8111 (1998) is set as a denominator (A) (g) and a mass obtained by removing moisture in the chemicals contained in the tissue paper product having a predetermined mass is set as numerator (B) (g).

(Chemical agent content ratio %)=(B)/(A)×100(%)

(Chemicals Content Density)

The chemicals content density indicates a chemical agent content per each volume of the two-ply tissue paper in the standard state of JIS P 8111 (1998).

(Sheet Thickness)

The sheet thickness of the tissue paper according to the invention is set to 100 to 140 µm and more desirably, 120 to 140 µm in the two-ply state. It is desirable that the sheet thickness is less than 100 µm from the view point of the improvement in softness, but it is difficult to appropriately ensure the strength as the tissue paper. Further, when the sheet thickness exceeds 140 µm, the sensation of touch on the tissue paper becomes unsatisfactory and the sensation of stiffness in use is generated.

As a method of measuring the sheet thickness, a test piece is sufficiently moisturized under the condition of JIS P 8111 (1998), and the thickness of the test piece in a two-ply state is measured by a dial thickness gauge (a thickness measurement unit) "PEACOCK G type" (manufactured by OZAKI MFG Co., Ltd.) under the same condition. Specifically, a plunger is lowered onto a measurement stand after making sure there is no foreign matters or dusts between the plunger and the measurement stand, a scale of the dial thickness gauge is moved and adjusted to a zero point, and then the plunger is raised so that the test piece is put on the measurement stand. Then, the gauge at that time is read out after gradually lowering the plunger. At this time, the plunger is just put on the test piece. The terminal of the plunger is made of metal, and is disposed so that the circular plane of a diameter of 10 mm is perpendicular to the paper plane. Then, the load at the measurement of the sheet thickness is about 70 gf. Furthermore, the sheet thickness is set as the average value which may be obtained after performing the measurement ten times.

(Tensile Strength)

The tensile strength of the tissue paper according to the invention is measured in the two-ply state.

The dry tensile strength is measured based on the tensile test method of JIS P 8113 (1998). In the method, the tissue paper is cut into the width of 25 mm in the lengthwise direction and the widthwise direction under the standard condition specified in JIS P 8111 (1998).

The dry tensile strength of the tissue paper according to the invention is set to 180 to 350 cN/25 mm and more desirably 160 to 300 cN/25 mm in the MD direction and is set to 80 to 120 cN/25 mm and more desirably 80 to 110 cN/25 mm in the CD direction. It is desirable that the ratio of the MD direction/the CD direction be set to 1.5 to 3.0.

The wet tensile strength is measured based on JIS P 8135 (1998). The wet tensile strength of the tissue paper is set to 70 to 160 cN/25 mm and more desirably 80 to 130 cN/25 mm in the MD direction and is set to 33 to 50 cN/25 mm and more desirably 35 to 45 cN/25 mm in the CD direction.

(Softness)

The value of the softness of the tissue paper of the invention is set to 0.9 to 1.5 cN/100 mm. Here, the softness is measured based on the Handle-o-meter method based on JIS L1096 E.

Here, the size of the test piece is set to 100 mm×100 mm and the clearance is set to 5 mm. The one-ply test piece is measured five times in each of the lengthwise direction and the widthwise direction, and the average value of the measurement values performed ten times in total is expressed to two decimal places by the unit of cN/100 mm.

(Moisture Ratio)

It is desirable that the moisture ratio of the product be set to 10.0 to 13.0%. The moisture ratio is obtained based on JIS P 8127.

Moisture ratio (%)={(weight of undried paper)−(weight of dried paper)}/(weight of undried paper)×100

(Elongation Ratio)

It is desirable that the elongation ratio of the product in the MD direction be 11.0 to 15.0%. Here, the elongation ratio is measured by a "Tensile and Compression Testing Machine TG-200 N" manufactured by MINEBEA Co., Ltd. The elongation ratio is based on "stretch at break" described in 3. Definition e) of JIS P 8113.

(Static Friction Coefficient)

On the other hand, the static friction coefficient of the tissue paper of the invention is desirably 0.50 to 0.65 and more desirably 0.55 to 0.60. Here, the static friction coefficient is measured by the following method based on JIS P 8147 (1998).

The one-ply tissue paper is attached to an acrylic plate so that the outer side surface of the tissue paper faces the outside. The two-ply tissue paper is wound on the weight of 100 g and is loaded on the tissue on the acrylic plate. The angle at which the weight slides and falls is measured by inclining the acrylic plate. The angle is measured eight times in total, four times in the MD direction and four times in the CD direction, the average angle is calculated, and the tangent value thereof is set as the static friction coefficient.

(MMD)

The MMD indicates the average deviation (unit: non-dimension) of the friction coefficient µ. The MMD is one index of smoothness. It is said that the smaller the deviation MMD is, the larger the smoothness is, while the larger the deviation MMD is, the smaller the smoothness is.

Figure 11:
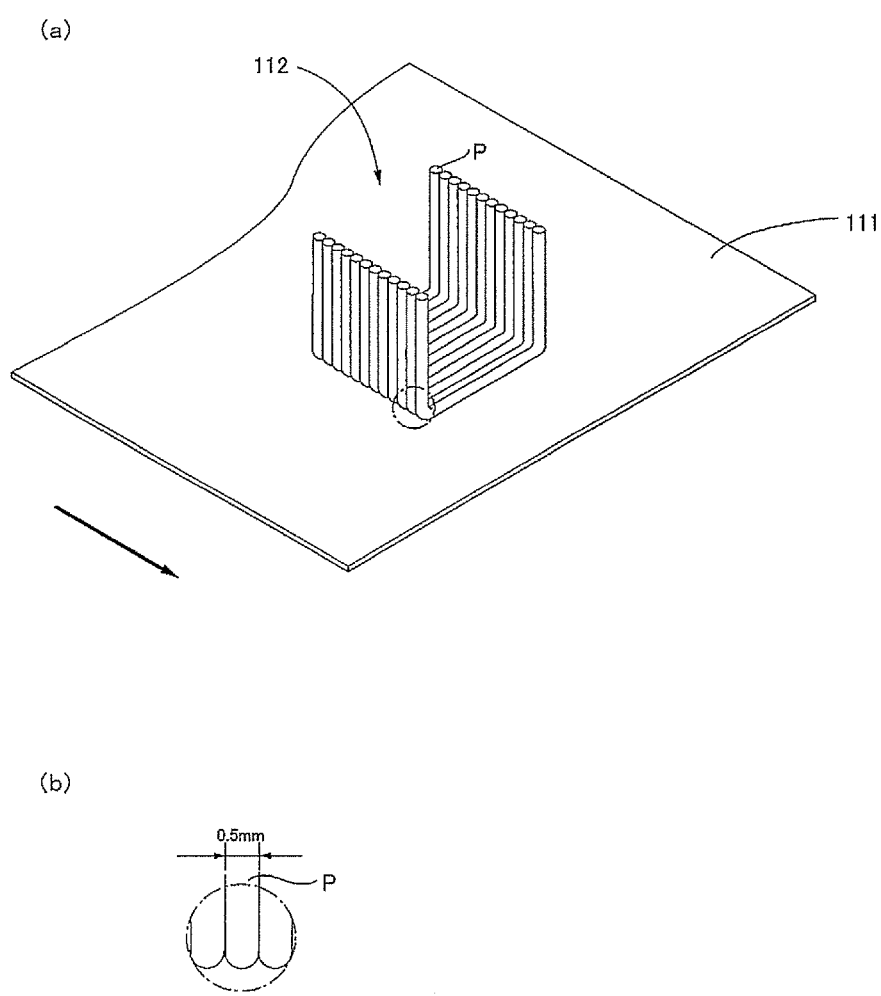
FIG. 11 is a diagram illustrating a method of measuring a MMD value of the tissue paper.

Furthermore, in the method of measuring the MMD value, as illustrated in FIG. 11(a), a contact surface of a friction member 112 contacts the surface of the tissue paper 111 as the measurement specimen which is tensioned by 20 g/cm in a predetermined direction (the rightward inclined down direction of FIG. 11(a)) at the contact pressure of 25 g, and is moved by 2 cm at the speed of 0.1 cm/s in the same direction as the direction in which the tension is applied. At this time, the friction coefficient is measured by a friction tester KES-SE (manufactured by Kato Tech Co., Ltd.), and the average deviation in the friction distance of 2 cm (the movement distance is obtained by removing 5 mm from about 3 cm) of the friction coefficient µ is set as the MMD value.

Furthermore, a friction member 112 is formed by arranging twenty piano wires each having a diameter of 0.5 mm, and has a contact surface of which a length and a width are 10 mm. The contact surface is provided with a unit swelling portion of which the front end is formed by twenty piano wires P (with a curvature radius of 0.25 mm).

Furthermore, FIG. 11(a) schematically illustrates the friction member 112, and FIG. 11(b) is an enlarged diagram of the portion which is encircled by the one-dotted chain line of FIG. 11(a).

(Product Density)

The tissue paper according to the invention is subjected to a folding process by an interfolder or the like, and is cut into a product size at any step before and after the folding process. For example, the product is obtained by packing 180 sets. After the folding process of 180 sets, the paper density is desirably 0.15 to 0.25 g/cm³ and more desirably 0.17 to 0.23 g/m³. When the paper density is lower than 0.15 g/cm³, the sensation of moistness or smoothness may not be obtained. When the paper density is higher than 0.25 g/cm³, the thickness of the tissue paper is damaged, so that the sensation of stickiness is generated and the water absorbing property is degraded.

The density of the product is a value which is obtained by dividing the value (C) in which the basis weight of the moisturizing tissue paper product becomes twice under the condition of JIS P 8111 by the sheet thickness (D) in the tissue paper (the two-ply) according to "PEACOCK G type", and the value is expressed to three decimal places by the unit of g/cm³.

$$((\text{Density (g/cm}^3))=(C \text{ (g/m)})\times 2/(D \text{ (}\mu\text{m)}))$$

First Embodiment: Example of Manufacturing Method Using on-Machine Applying

The tissue paper of the invention described above may be manufactured as below. FIG. 1 illustrates an outline of an apparatus which performs a tissue paper ply step according to the invention. Furthermore, it is desirable that the process according to FIG. 1 be performed by the ply machine as an apparatus integrated with a chemicals applier (on-machine application).

The base paper which is made by the paper making machine is subjected to crepe in the form of the continuous sheet, is subjected to the calender processing, and is wound as primary paper rolls 11 and 12 (which are generally called also jumbo rolls).

Single-sheets 31 and 32 from primary paper rolls are multi-ply formed by a multi-ply forming roller 13 into the two-ply sheet, are subjected to a calender processing by a ply machine calender 14 if necessary, and are sent to a chemicals applying step. As the chemicals applying method, an existing applying method such as dipping, spray-application, flexographic application, and gravure application may be used. However, when using the printing method such as gravure application and flexographic application which applies chemicals without unevenness in the entire surface to be applied particularly by using a flexographic coater with a doctor chamber 15, the chemicals may be supplied with the stable chemicals application amount, and hence this is more desirable.

In the ply step of FIG. 1, two flexographic coaters 16 and 17 are provided, and the chemicals are applied on the respective surfaces of the two-ply continuous sheet.

When the flexographic printing is used in the chemicals applying unit, the process speed is set to 100 to 1100 m/minute, desirably 350 to 1050 m/minute, and more desirably 450 to 1000 m/minute. When the process speed is less than 100 m/minute, the productivity is low. When the process speed exceeds 1100 m/minute, the chemicals application is not evenly performed, so that the chemicals may easily scatter. The number of lines of the press plate roll is set to 10 to 60 lines, desirably 15 to 40 lines, and more desirably 20 to 35 lines. When the number of lines is less than 10 lines, the chemicals application is not evenly performed. On the other hand, when the number of lines exceeds 60 lines, paper dust may be easily jammed therein. The number of lines of the anilox roll is set to 10 to 300 lines, desirably 25 to 200 lines, and more desirably 50 to 100 lines. When the number of lines is less than 10 lines, the chemicals application is not evenly performed. On the other hand, when the number of lines exceeds 300 lines, paper dust may be easily jammed therein. The cell capacity of the anilox roll is set to 10 to 100 cc, desirably 15 to 70 cc, and more desirably 30 to 60 cc. When the cell capacity is less than 10 cc, a desired chemicals application amount may not be obtained. On the other hand, when the cell capacity exceeds 100 cc, the amount of scattered chemicals increases.

Even when the process speed is fast, the flexographic printing may stabilize the chemicals application amount and stably apply the chemicals in a wide range with stable viscosity by one roll.

When the gravure printing is used in the chemicals applying unit, the process speed is set to 100 to 1000 m/minute, desirably 350 to 950 m/minute, and more desirably 450 to 950 m/minute. When the process speed is less than 100 m/minute, the productivity is low. When the process speed exceeds 1000 m/minute, the chemicals application is not evenly performed, so that the chemicals may easily scatter. Further, the number of lines of the gravure roll is set to 40 to 160 lines, desirably 60 to 140 lines, and more desirably 80 to 120 lines. When the number of lines is less than 40 lines, the amount of scattered chemicals increases. On the other hand, when the number of lines exceeds 160 lines, paper dust may be easily jammed therein.

The sheet applied by the chemicals is provided for a ply bonding roll 18 and a roll 19, and is fixed by performing ply bonding (knurling) on the two-ply continuous sheet. At this time, the continuous sheet 32 having a small chemicals application amount is disposed so as to contact the ply bonding roll 18. It is desirable that the ply bonding is evenly performed in the lengthwise direction by the width of 1 to 10 mm at the position of 1/10 to 1/20 in the paper surface from both side portions. The ply may be fixed by an adhesive or the like by any existing method. However, when the adhesive is used, there are problems in which the hard sensation of touch may be easily generated and the ply may be separated when applying the chemicals. For this reason, it is more desirable to use the ply bonding.

The two-ply continuous sheet subjected to the ply bonding is directly provided for a rotary type interfolder or the like so as to be folded and is cut into a product size. Alternatively, the two-ply continuous sheet is cut into a product size by a slitter 20, is wound by a winding drum 21 so as to become a secondary paper roll 22, is subjected to a folding process, and is stored in a paper box.

Furthermore, in the embodiment, the chemicals are applied on the sheet before the ply bonding, but the chemicals may be applied on the sheet after the ply bonding.

The secondary paper roll is particularly provided for the folding step in the field of the tissue paper products. As the folding step, an existing method such as a rotary type interfolder and a multi-stand type interfolder may be used, but it is more desirable to use the multi-stand type interfolder with high productivity.

(Multi-Stand Type Interfolder)

A plurality of secondary paper rolls 22 are set on the multi-stand type interfolder. Then, the multi-ply-sheets from the secondary paper rolls set on the secondary paper rolls 22 are continuously reeled out, are folded, and are stacked, thereby manufacturing a tissue paper bundle. Hereinafter, an example of the multi-stand type interfolder will be described.

Figure 2:
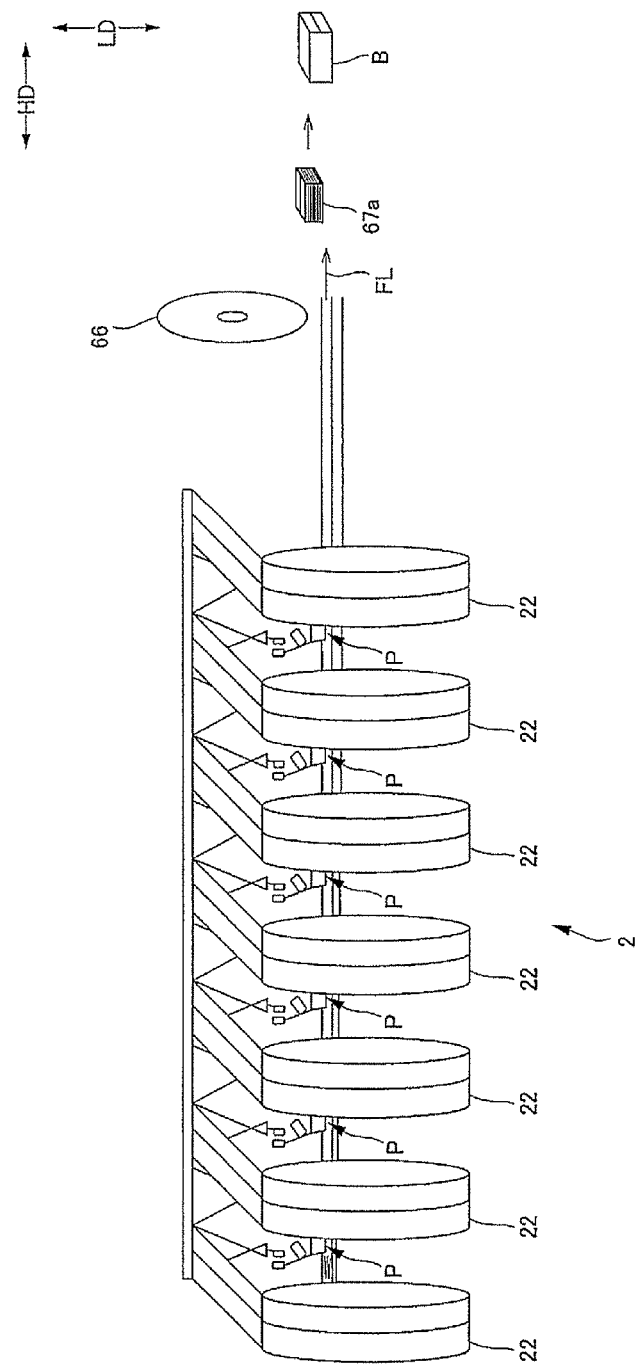
FIG. 2 is a schematic diagram illustrating an example of a multi-stand type interfolder and illustrates a state where the interfolder is seen from the front.
Figure 3:
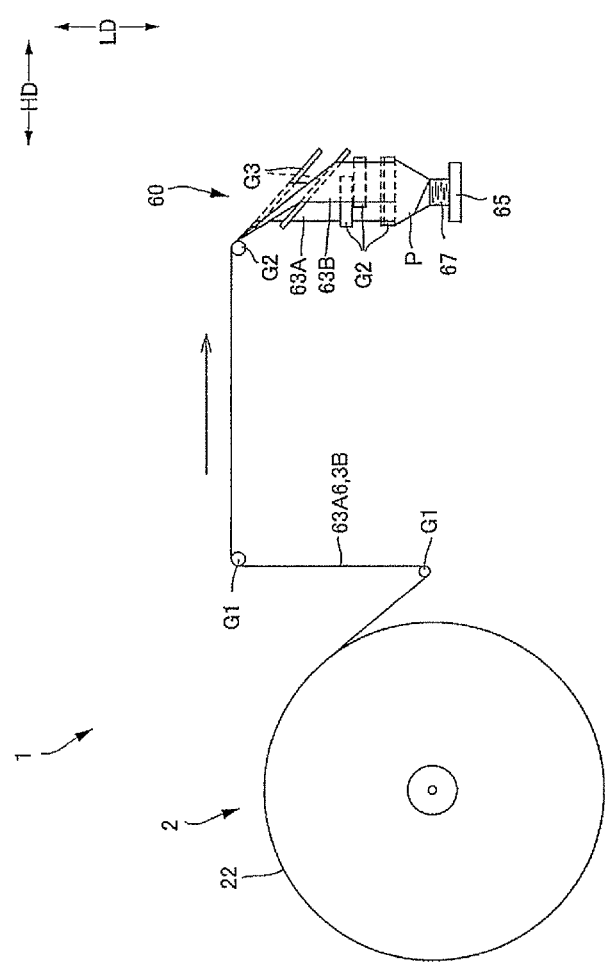
FIG. 3 is a schematic diagram illustrating an example of a multi-stand type interfolder and illustrates a state where the interfolder is seen from the side.

FIGS. 2 and 3 illustrate an example of the multi-stand type interfolder. The reference numeral 2 in the drawings indicates the secondary paper rolls 22, 22 . . . which are set on a secondary paper roll support portion (not illustrated) of the multi-stand type interfolder 1. The secondary paper rolls 22, 22 . . . are evenly set as many as a necessary number in a direction perpendicular to the plane illustrated in the drawing (the horizontal direction of FIG. 2 and the direction perpendicular to the drawing paper of FIG. 3). Each secondary paper roll R is slit into a tissue paper product width by the above-described facility and the method for manufacturing the secondary paper roll for tissue paper products, and is wound and set at multiple times the width of the tissue paper product, that is, twice the width thereof in the example illustrated in the drawings.

Figure 4:
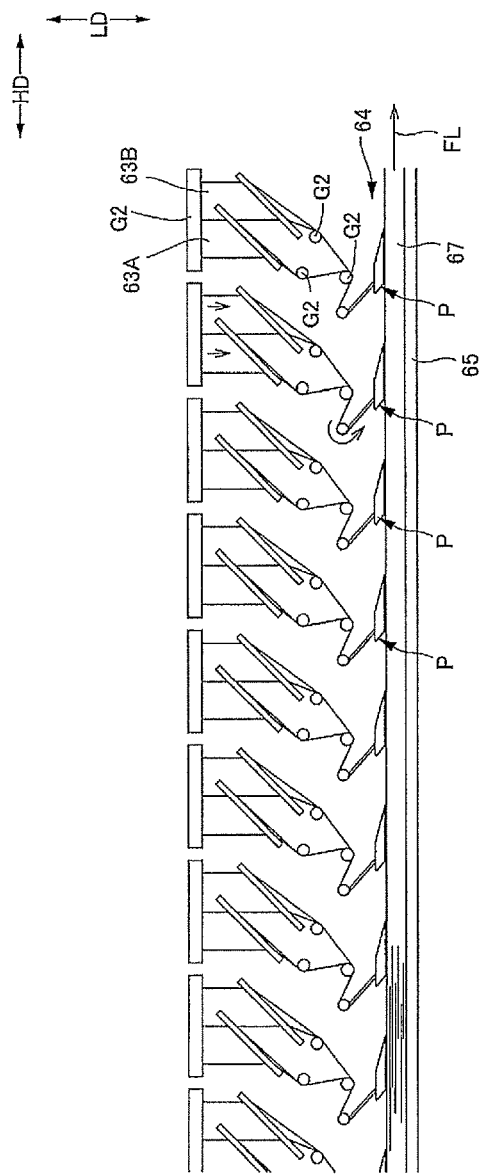
FIG. 4 is a schematic diagram illustrating an example of a multi-stand type interfolder and illustrates a state where the interfolder is seen from the front.

Continuous band-like multi-ply-sheets 63A and 63B which are reeled out from the secondary paper roll 22 are guided by a guide unit such as guide rollers G1 and G1, and are conveyed to a folding mechanism 60. Further, as illustrated in FIG. 4, the folding mechanism 60 is provided with a folding plate group 64 in which folding plates P, P . . . are provided in parallel as many as the necessary number. As for each folding plate P, a pair of guide rollers G2 and G2 and a pair of guide round bar members G3 and G3 are provided in series at appropriate positions so as to guide the multi-ply-sheets 63A and 63B from the secondary paper rolls. Further, a conveyor 65 which receives and conveys a folded and stacked multi-ply formed band 67 is provided below the folding plates P, P . . . .

Figure 5:
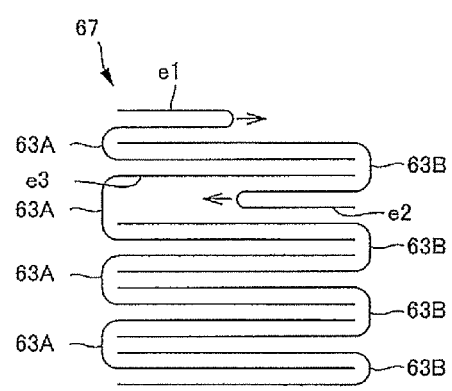
FIG. 5 is a longitudinal sectional view of folded tissue paper.
Figure 6:
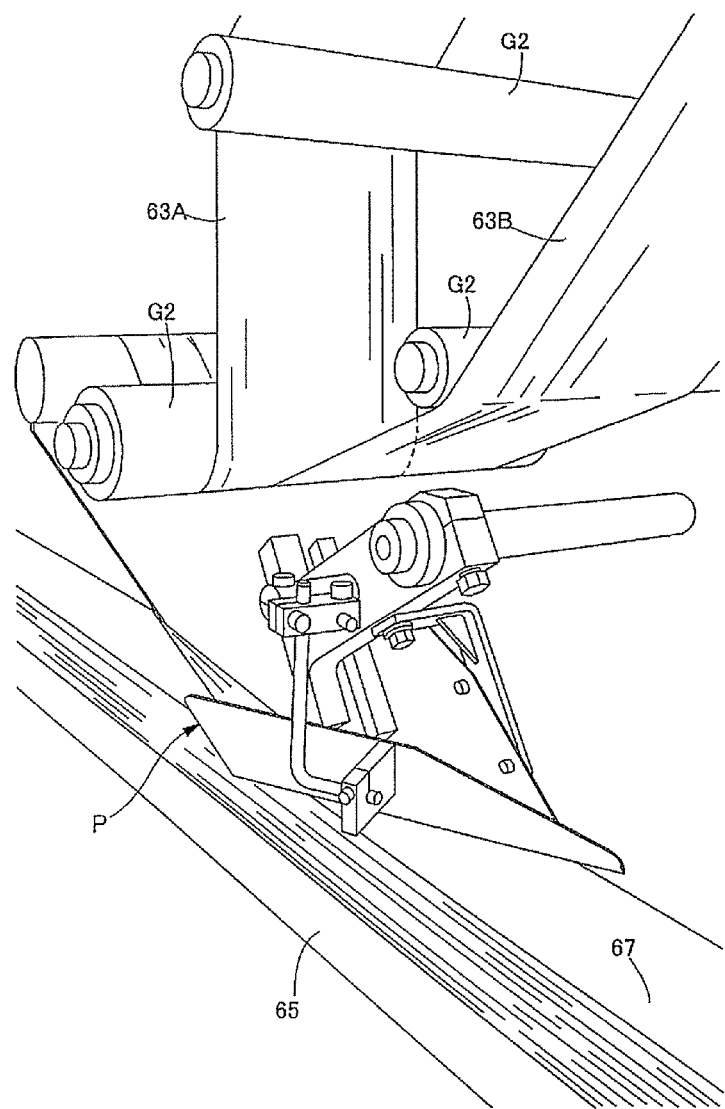
FIG. 6 is a main enlarged perspective view of a portion relating to a folding plate.

A folding mechanism which uses such folding plates P, P . . . is, for example, an existing mechanism according to the specification of U.S. Pat. No. 4,052,048. As illustrated in FIG. 5, such a folding mechanism stacks multi-ply-sheets from the secondary paper rolls while folding the respective continuing multi-ply-sheets 63A and 63B from the secondary paper rolls . . . in a Z-shape and multiplying the side end portions of the adjacent continuing multi-ply-sheets 63A and 63B . . . from the secondary paper rolls.

FIGS. 6 to 9 specifically illustrate a portion of the folding plate P in the folding mechanism 60. In the folding mechanism 60, the pair of continuing multi-ply-sheets 63A and 63B from the secondary paper rolls is guided to each folding plate P. At this time, the continuing multi-ply-sheets 63A and 63B from the secondary paper rolls are guided by the guide round bar member G3 and G3 while shifting the positions so that the side end portions do not overlap each other.

Figure 7:
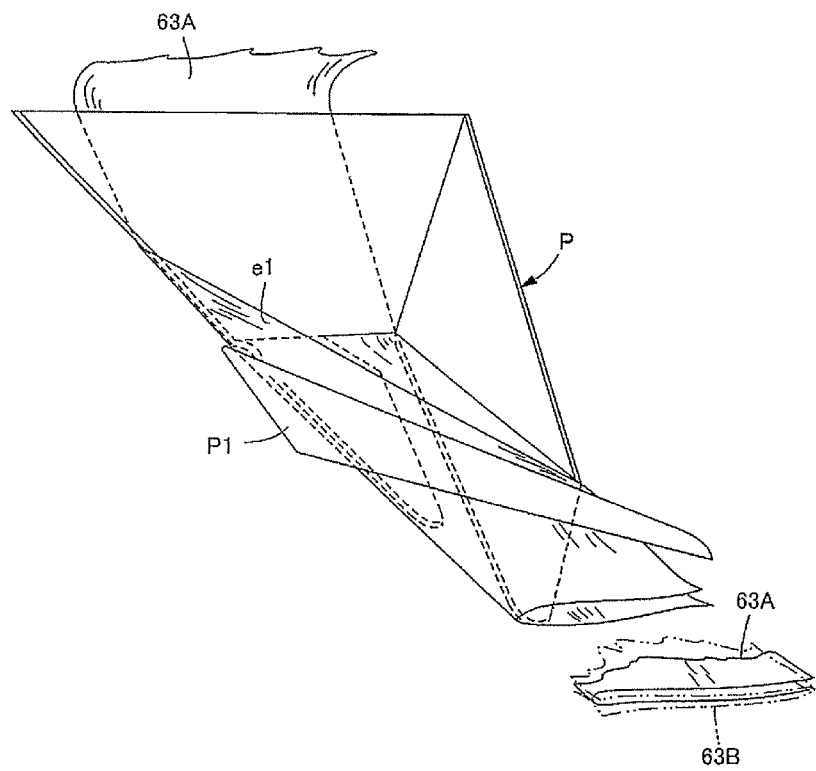
FIG. 7 is a main enlarged perspective view illustrating a method of folding a multi-ply-sheet (tissue paper) from a secondary paper roll.
Figure 8:
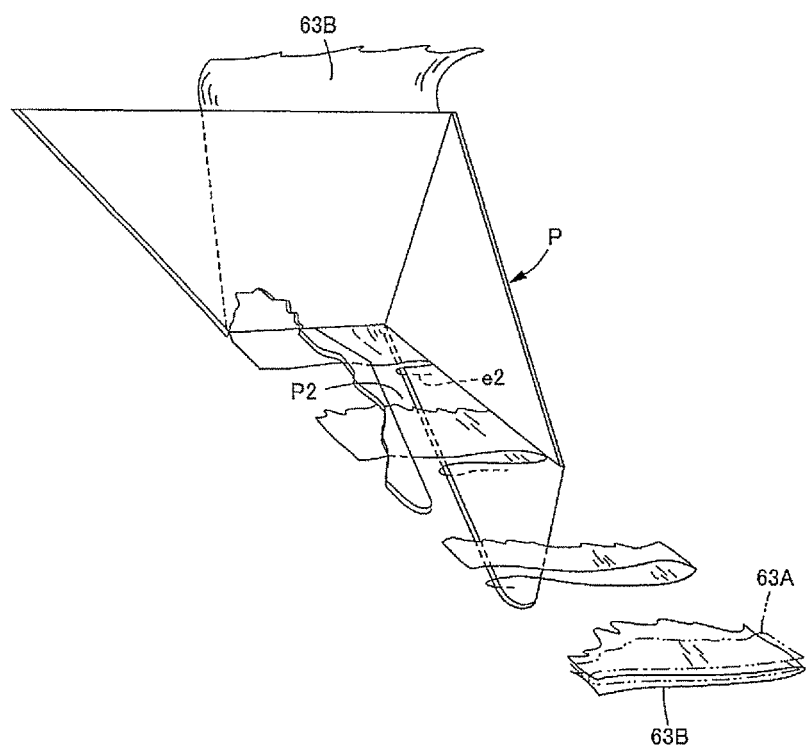
FIG. 8 is a main enlarged perspective view illustrating the method of folding the multi-ply-sheet (tissue paper) from the secondary paper roll.
Figure 9:
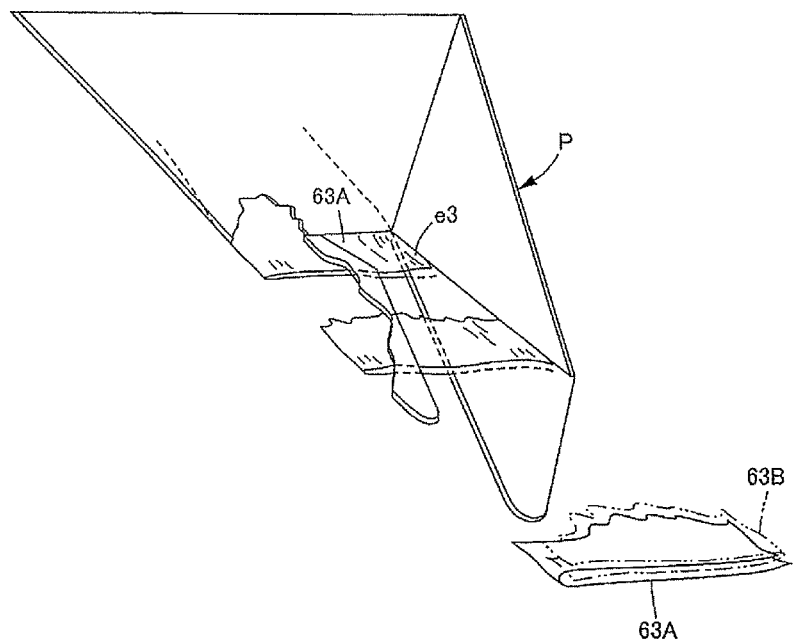
FIG. 9 is a main enlarged perspective view illustrating the method of folding the multi-ply-sheet from the multi-ply-sheet (tissue paper) from the secondary paper roll.

When guided to the folding plate P, a lower sheet of the multi-ply-sheet from the secondary paper roll is set as the first multi-ply-sheet 63A from the secondary paper roll while an upper sheet of the multi-ply-sheet from the secondary paper roll is set as the second multi-ply-sheet 63B from the secondary paper roll. Then, the side end portion e1 of the first multi-ply-sheet 63A which does not overlap the second multi-ply-sheet 63B is folded by the side plate P1 of the folding plate P so as to be folded back at the upper side of the second multi-ply-sheet 63B as illustrated in FIGS. 5 and 7, and the side end portion e2 of the second multi-ply-sheet 63B which does not overlap the first multi-ply-sheet 63A is folded back to the lower side so as to be guided to the lower side of the folding plate P from the slit P2 of the folding plate P as illustrated in FIGS. 5 and 8. At this time, as illustrated in FIGS. 5 and 9, the side end portion e3 (e1) of the first multi-ply-sheet 63A which is stacked on the upstream folding plate P while being folded is guided from the slit P2 of the folding plate P to the folding-back portion of the second multi-ply-sheet 63B. In this way, the respective continuing multi-ply-sheets 63A and 63B from the secondary paper rolls . . . are folded in a Z-shape and the side end portions of the adjacent continuing multi-ply-sheets 63A and 63B from the secondary paper rolls are multiplied. Accordingly, when the uppermost tissue paper is taken out when using the product, the side end portion of the next tissue paper is taken out.

Figure 10:
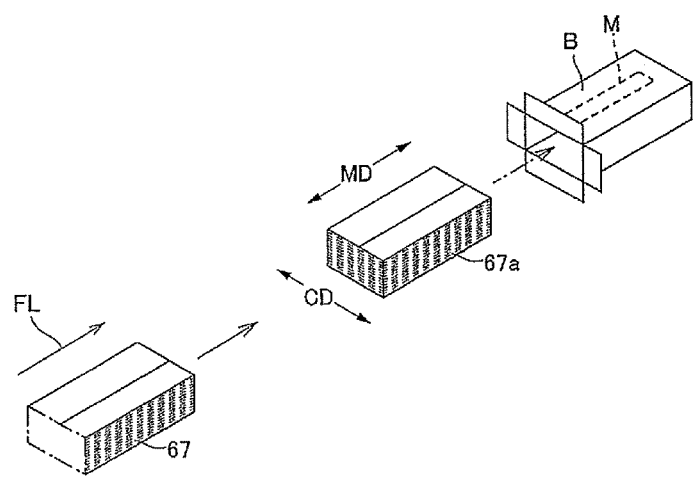
FIG. 10(a) is a diagram illustrating a state where a tissue paper bundle of the first embodiment is stored in a storage box and FIG. 10(b) is a partially cutaway diagram illustrating a state where the tissue paper stored in the storage box is taken out.
Figure 10:
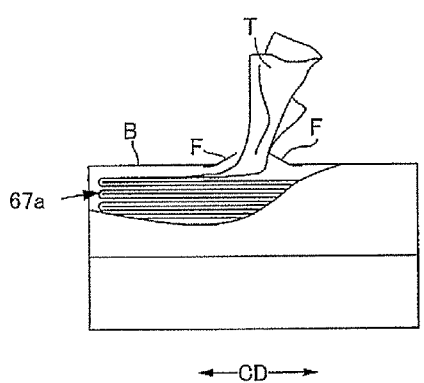

As illustrated in FIG. 2, the multi-ply formed band 70 which is obtained by the multi-stand type interfolder 6 as described above is cut (disconnected) at a predetermined interval in the flow direction FL by a cutting unit 66 at the rear stage so as to become a tissue paper bundle 67a, and as illustrated in FIG. 10(a), the tissue paper bundle 30a is stored in a storage box B by the facility at the farther rear stage. Furthermore, in the multi-stand type interfolder 1 with the above-described configuration, the direction of the sheet of the multi-ply formed band 70 becomes the lengthwise direction (the MD direction) along the flow direction FL and the widthwise direction (the CD direction) along the direction perpendicular to the flow direction. For this reason, as illustrated in FIG. 10(a), the direction of the sheet of the tissue paper which constitutes the tissue paper bundle 67a obtained by cutting the multi-ply formed band 70 in a predetermined length becomes the widthwise direction (the CD direction) along the direction of folding the tissue paper and the lengthwise direction (the MD direction) along the direction perpendicular to the direction of folding the tissue paper.

FIG. 10(b) illustrates an example of the product which is obtained by storing the tissue paper bundle 67a in the storage box B. The upper surface of the storage box B is provided with a perforated line M, and when a part of the upper surface of the storage box B is broken by the perforated line M, the upper surface of the storage box B is opened. The opening is covered by a film F having a slit at the center thereof, and the tissue paper T may be taken out through the slit formed in the film F.

Incidentally, as described above, since the direction of the sheet of the tissue paper which constitutes the tissue paper bundle 67a becomes the widthwise direction (the CD direction) along the direction of folding the tissue paper, when taking the tissue paper T out from the storage box B as illustrated in FIG. 10(b), the taking-out direction follows the widthwise direction (the CD direction) of the tissue paper T.

Figure 12:
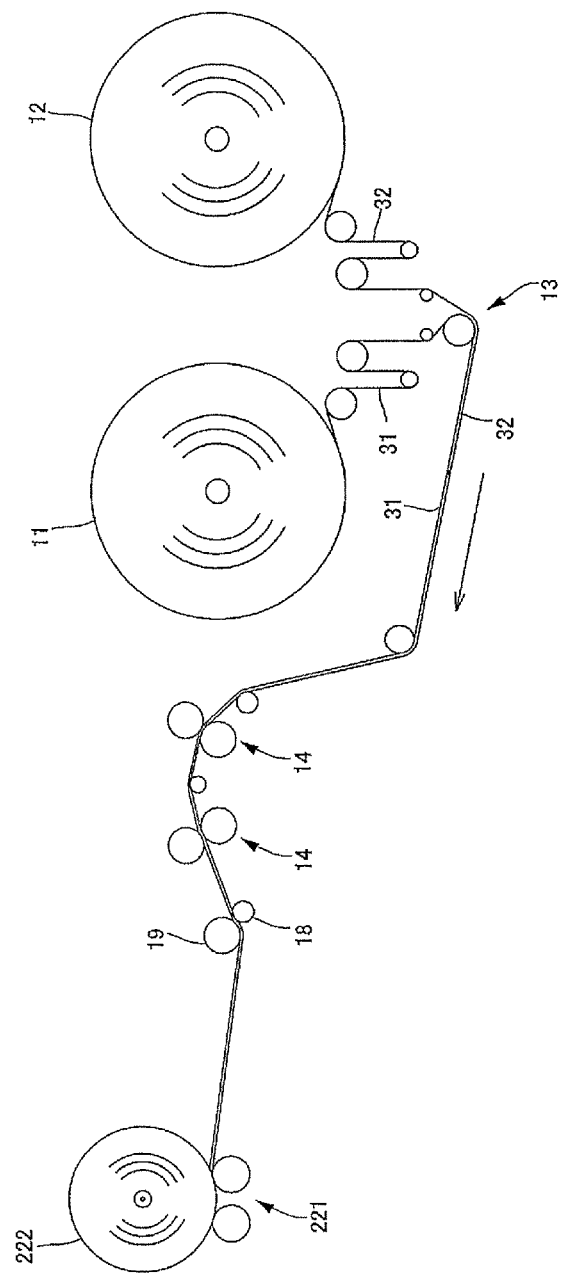
FIG. 12 is a diagram illustrating a tissue paper ply step of a second embodiment according to the invention.

Second Embodiment: Example of Manufacturing Method Using Off-Machine Application The chemicals applied tissue paper according to the invention may be manufactured by using the chemicals applying device of the off-machine. When performing the chemicals applying with the off-machine, the ply step is performed by the ply machine illustrated in FIG. 12. The single-sheets 31 and 32 from the primary paper rolls 11 and 12 are multi-ply formed by the multi-ply forming roller 13 so as to become the two-ply continuous sheet, and are provided for the ply bonding roll 18 and the roll 19 without being subjected to the chemicals applying step.

The two-ply continuous sheet subjected to the ply bonding is wound by a winding roll 221 so as to become a secondary paper roll (which is not applied by the chemicals) 222. The secondary paper roll is provided for the chemicals applying device of the off-machine.

The operation of the ply machine may be performed at 100 to 1100 m/minute. However, when the rotary type interfolder to be described later is used in the folding process, the operation may be actually performed at 80 to 100 m/minute due to the operation speed of the interfolder as a rate-limiting factor.

(Off-Machine Chemicals Applying Device)

Figure 13:
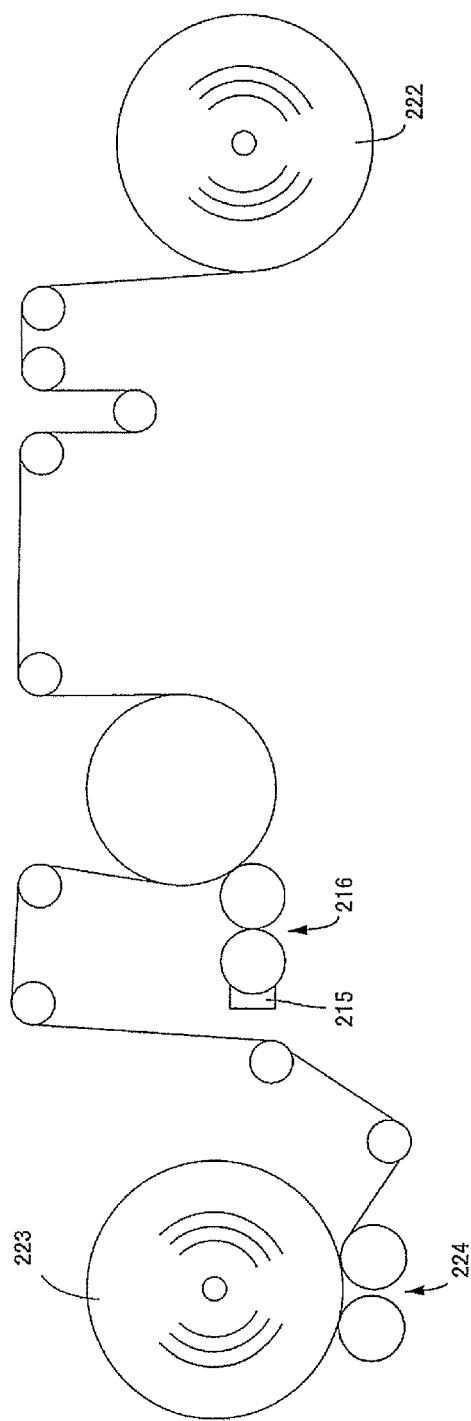
FIG. 13 is a schematic diagram illustrating an example of a chemicals applying step of an off-machine.

FIG. 13 illustrates a chemicals applying device according to a second embodiment. In the example illustrated in the drawing, a multi-ply-sheet which is reeled out from the secondary paper roll 222 is applied by the chemicals using a flexographic coater 216 having a doctor chamber 215. In the example illustrated in the drawing, the chemicals are applied only one surface of the two-ply-sheet from the secondary paper roll, but may be applied onto both side surfaces thereof. The chemicals applied sheet is wound by a winding drum 224 so as to become a tertiary paper roll 223. The tertiary paper roll is provided for the rotary type interfolder so as to be subjected to the folding process. Alternatively, the chemicals applied sheet may be cut into a product width through a slitter and be wound so as to become the tertiary paper roll, and the sheet may be folded by the multi-stand type interfolder.

(Rotary Type Interfolder)

Figure 14:
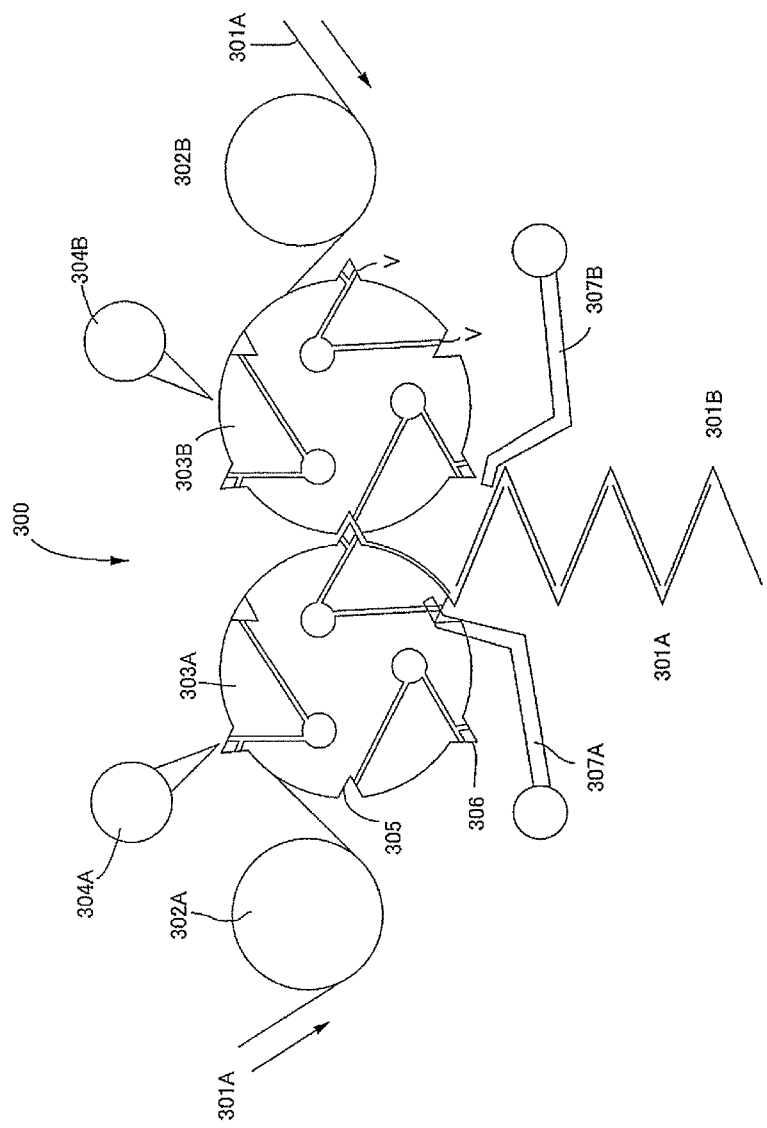
FIG. 14 is a schematic diagram illustrating an example of a rotary type interfolder.

FIG. 14 illustrates an example of the rotary type interfolder. In a rotary interfolder 300, two chemicals applied multi-ply sheets 301A and 301B from the tertiary paper roll are respectively sent continuously to folding rolls 303A and 303B through feeding rolls 302A and 302B. Cutter blades 304A and 304B are fixed to the upper side of the folding rolls, and the sheets are cut at cutting dies 305 on the folding rolls. In order to prevent the cut sheet from being separated from the roll, vacuum holes V are disposed at both sides with each tip of the cutting die 305 being interposed therebetween, and the sheet is fixed onto the roll by the function of the vacuum. The folding roll also includes a folding die 306, and the cutting die 305 and the folding die 306 are alternately arranged at the same interval. The length of the circumference of the roll between two cutting dies 305 is set to be equal to the length of the tissue paper product in the MD direction, and the length of the circumference of the roll of the folding die 306 adjacent to the cutting die 305 is set to the half thereof. Furthermore, the folding die 306 also includes a vacuum hole.

The cutting die and the folding die or the folding die and the cutting die of two folding rolls 303A and 303B are respectively fitted to each other by the rotation. In the example illustrated in the drawing, the sheet 301A and the sheet 301B overlap each other at the fitting position, and a folding line is formed at the position overlapping the cutting line of the sheet 301A in the sheet 301B. The sheets 301A and 301B overlapping each other and having the folding lines are peeled off from the folding roll 303B by the vertical movement of a folding bar 307B. At the next fitting position, the folding line is formed in the sheet 301A, and is peeled off from the folding roll 303A by a folding bar 307A.

Figure 15:
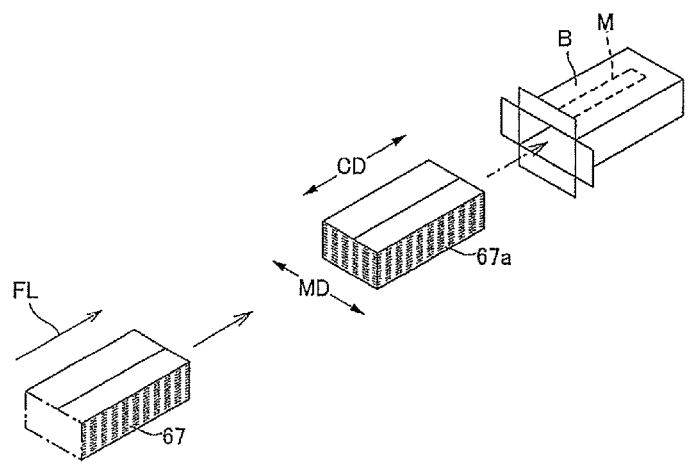
FIG. 15(a) is a diagram illustrating a state where a tissue paper bundle of the second embodiment is stored in a storage box and FIG. 15(b) is a partially cutaway diagram illustrating a state where the tissue paper stored in the storage box is taken out.
Figure 15:
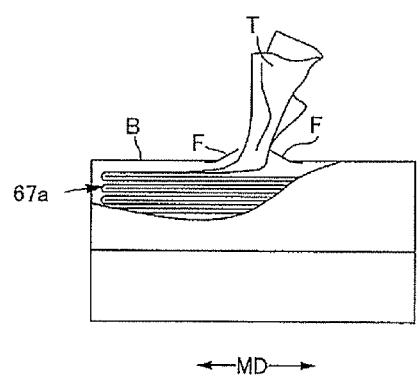

As described above, the cutting and the folding of the sheets 301A and 301B are alternately repeated, so that the cut sheets 301A and 301B are folded so as to engage with each other. The folded sheet is cut into a product width (in the CD direction) and is packed in a box (FIG. 15). In the tissue paper which is manufactured in the embodiment, the pulling direction in use becomes the MD direction.

Example

In order to check the effect of the invention, the results which are obtained by evaluating the paper quality of the product using Comparative Examples and Examples according to the invention are illustrated in Table 1.

Examples 1 and 2 indicate the tissue paper which is manufactured by the manufacturing process illustrated in the first embodiment, where both side surfaces thereof are applied by the chemicals. In Example 1, the folding process is performed by the multi-stand type interfolder, and in Example 2, the folding process is performed by the rotary type interfolder. Example 3 indicates the tissue paper which is manufactured by the manufacturing process illustrated in the second embodiment, where one side surface is applied by the chemicals and the folding process is performed by the rotary type interfolder.

Comparative Examples 1 and 4 to 7 indicate the commercialized products, where Comparative Example 1 indicates non-moisturizing general tissue paper, Comparative Examples 4 and 5 indicate moisturizing lotion type tissue paper, and Comparative Examples 6 and 7 indicate non-moisturizing high-quality tissue paper having a large basis weight and a large sheet thickness. Comparative Example 2 indicates the tissue paper which is manufactured by the manufacturing process illustrated in the first embodiment of the invention by decreasing the chemicals application amount. Further, Comparative Example 3 indicates the tissue paper which is manufactured in a manner such that the chemicals are applied on both side surfaces by gravure printing in the manufacturing process illustrated in the second embodiment of the invention, where the amount of the chemicals is larger than that of Examples.

In each of Examples 1 to 3 and Comparative Examples 2 and 3, the composition of the applied chemicals is adjusted as illustrated in Table 1.

The methods of measuring the basis weight, the sheet thickness, the tensile strength, the expansion rate, the softness, the static friction coefficient, and the moisture ratio are described above in DESCRIPTION OF EMBODIMENTS. The chemical agent content ratio indicates a ratio of the dry weight of the chemical agent with respect to the tissue paper basis weight.

In Examples 1 to 3 and Comparative Examples 1 to 7, the organoleptic evaluation based on the following standard was performed for thirty persons on the sensation of softness, smoothness, thickness, and moistness together with the evaluation of the paper quality. The organoleptic evaluation was performed based on the following standard in which the result of Comparative Example 1 as the non-moisturizing tissue paper was set as 3.

5: very excellent

4: excellent

3: approximately standard

2: poor

1: noticeably poor

Further, in the chemicals applied tissue paper, the presence of the sensation of stickiness was also evaluated.

○: small sensation of stickiness

X: sharp sensation of stickiness

TABLE 1

| | | | Example 1 | Example 2 | Example 3 | Comparative example 1 | Comparative example 2 | Comparative example 3 | Comparative example 4 | Comparative example 5 | Comparative example 6 | Comparative example 7 |
|---|---|---|---|---|---|---|---|---|---|---|---|---|
| Base paper condition | Mixing ratio of pulp | — | N:L = 3:7 | N:L = 3:7 | N:L = 3:7 | N:L = 3:7 | N:L = 3:7 | N:L = 6:4 | — | — | — | — |
| | Crepe ratio | % | 20.0 | 19.5 | 19.5 | 16.0 | 19.0 | 14.0 | — | — | — | — |
| | Softening agent | % | — | — | — | 0.45 | — | 0.6 | — | — | — | — |
| | Starch | % | — | — | — | 8.0 | — | 7.0 | — | — | — | — |
| | Wet paper strong agent | Kg/t | 11.0 | 11.0 | 11.0 | 7.0 | 11.0 | 17.0 | — | — | — | — |
| Chemicals application | Chemicals application | Presence or non-presence | Presence | Presence | Presence | Non-presence | Presence | Presence | Presence | Presence | Non-presence | Non-presence |
| | Moisture content | % by mass | 10 | 10 | 10 | | 21 | 12 | | | | |
| | Viscosity (40° C.) | mPa·s | 110 | 110 | 110 | | 110 | 110 | | | | |
| | Applying method | — | Doctor chamber type flexographic transferring | Doctor chamber type flexographic transferring | Doctor chamber type flexographic transferring | | Doctor chamber type flexographic transferring | Roll transfer type gravure transferring | | | | |
| | Speed of application | m/minute | 950 | 750 | 250 | | 250 | 100 | | | | |
| Composition of chemicals | Polyol (glycerin) | % | 74.0% | 80.0% | 84.5% | | 84.5% | 84.5% | | | | |
| | Polyol (sorbitol) | % | 10.0% | 5.0% | 0.0% | | 0.0% | 0.0% | | | | |
| | Emulsifying agent | % | 1.0% | 0.7% | 0.8% | | 0.8% | 0.8% | | | | |
| | Inorganic or organic particulate powder | % | 1.5% | 1.2% | 1.4% | | 1.4% | 1.4% | | | | |
| | Oily constituent | % | 2.5% | 2.1% | 2.3% | | 2.3% | 2.3% | | | | |
| | Preservative agent | % | 0.1% | 0.1% | 0.1% | | 0.1% | 0.1% | | | | |
| | Antifoam agent | % | 0.1% | 0.1% | 0.1% | | 0.1% | 0.1% | | | | |
| | Water | % | 10.8% | 10.8% | 10.8% | | 10.8% | 10.8% | | | | |
| | Sum | % | 100.0% | 100.0% | 100.0% | | 100.0% | 100.0% | | | | |
| Chemical agent content (absolutely dried) | Content on both side surfaces | g/m² | 4.0 | 4.0 | 4.4 | | 1.4 | 5.6 | | | | |
| | Surface to be applied | — | Both side surfaces | Both side surfaces | One side surface | | Both side surfaces | Both side surfaces | | | | |
| | Chemical agent content ratio | % by mass | 14.1 | 14.1 | 15.3 | | 5.8 | 17.2 | | | | |
| | Chemical agent content density* | g/cm³ | 0.030 | 0.031 | 0.032 | | 0.015 | 0.039 | | | | |

TABLE 1-continued

| Product | | | Example 1 | Example 2 | Example 3 | Comparative example 1 | Comparative example 2 | Comparative example 3 | Comparative example 4 | Comparative example 5 | Comparative example 6 | Comparative example 7 |
|---|---|---|---|---|---|---|---|---|---|---|---|---|
| | Basis weight (1P) | g/m² | 14.2 | 14.2 | 14.4 | 12.2 | 12.0 | 16.3 | 17.5 | 14.8 | 14.9 | 15.5 |
| | Sheet thickness (2P) | μm | 135 | 131 | 137 | 144 | 95 | 143 | 159 | 140 | 170 | 205 |
| 2P | Density | g/cm³ | 0.210 | 0.217 | 0.210 | 0.169 | 0.253 | 0.228 | 0.220 | 0.211 | 0.175 | 0.151 |
| | Dry tensile strength lengthwise | cN/25 mm | 262 | 241 | 237 | 287 | 237 | 259 | 283 | 251 | 261 | 291 |
| 2P | Dry tensile strength widthwise | cN/25 mm | 99 | 88 | 92 | 105 | 78 | 75 | 59 | 64 | 76 | 107 |
| 2P | Wet tensile strength lengthwise | cN/25 mm | 113 | 94 | 111 | 90 | 91 | 137 | 119 | 84 | 115 | 121 |
| 2P | Wet tensile strength widthwise | cN/25 mm | 42 | 42 | 43 | 28 | 34 | 40 | 32 | 29 | 37 | 34 |
| 2P | Elongation ratio (lengthwise) | % | 12.7 | 11.7 | 15.1 | 8.4 | 12.9 | 12.0 | 11.2 | 13.3 | 10.7 | 13.6 |
| 1P | Softness | cN/100 mm | 1.01 | 0.97 | 1.13 | 1.69 | 0.98 | 1.18 | 1.87 | 1.50 | 1.78 | 1.78 |
| 1P | MMD (front surface) | 1/100 | 7.9 | 7.2 | 7.7 | 9.0 | 7.4 | 7.1 | 6.4 | 6.5 | 7.5 | 7.3 |
| 2P | Static friction coefficient | — | 0.59 | 0.56 | 0.57 | 0.83 | 0.67 | 0.70 | 0.80 | 0.75 | 0.75 | 0.87 |
| | Moisture ratio | % | 11.7 | 12.4 | 11.1 | 6.5 | 7.6 | 13.8 | 9.3 | 10.0 | 6.5 | 6.9 |
| | Direction of taking out sheets | — | CD | CD | MD | CD | CD | MD | MD | MD | MD | MD |
| Organoleptic evaluation | Softness | | 5 | 5 | 5 | 3 | 4 | 5 | 4 | 5 | 3 | 3 |
| | Smoothness | | 5 | 5 | 4 | 3 | 4 | 5 | 4 | 4 | 3 | 3 |
| | Thickness | | 3 | 3 | 3 | 3 | 2 | 4 | 4 | 4 | 5 | 5 |
| | Moistness | | 5 | 5 | 5 | 3 | 4 | 5 | 4 | 4 | 3 | 3 |
| | Stickiness | | ○ | ○ | ○ | — | ○ | × | × | × | — | — |

"—" means that no data exists.

In the tissue paper according to the invention, the dry tensile strength and the wet tensile strength in the CD direction are larger than those of the commercialized moisturizing tissue. Further, the wet tensile strength in the CD direction is larger than that of the existing general tissue paper. Further, the softness and the static friction coefficient are lower than those of the commercialized product, and the paper quality is smooth and soft.

In the organoleptic evaluation, the tissue paper according to the invention does not have an excellent sensation of thickness. However, the softness, the smoothness, and the moistness which are either equaling or surpassing those of the moisturizing tissue, while the sensation of stickiness in the moisturizing tissue is reduced.

Particularly, in the tissue paper according to the invention, a satisfactory sliding property is obtained due to the followings. Although it depends on the permeability of the chemicals applied on the tissue paper, it is considered that the hydrophilic component may be absorbed into the pulp and the lipophilic component may easily remain on the surface of the paper when the chemicals including both hydrophilic and lipophilic components are applied on the paper, which reduces the friction of the surface. However, when the chemicals application amount is increased as in the existing moisturizing tissue, the hydrophilic component is not sufficiently absorbed into the pulp, but remains on the surface. For this reason, it is supposed that the friction reducing effect of the lipophilic component is weakened and the sliding property is degraded by the viscosity of the hydrophilic component (glycerin and the like).

In Comparative Example 2 in which the tissue paper is manufactured by further decreasing the chemicals application amount compared to the tissue paper according to the invention, there are advantages that excellent smoothness is obtained and the sensation of stickiness is not present. However, the tissue paper according to the invention obtained a satisfactory result in softness and moistness through the organoleptic evaluation.

Accordingly, it is proved that the tissue paper according to the invention is tissue paper which suppresses the sensation of stickiness over the existing moisturizing tissue and has softness, smoothness, and moistness either equaling or surpassing those of the moisturizing tissue.

INDUSTRIAL APPLICABILITY

The tissue paper of the invention may be used as the tissue paper for a wiping purpose, and particularly, a body wiping purpose and also a facial purpose and the like.

EXPLANATIONS OF LETTERS OR NUMERALS

1: multi-stand type interfolder
11: primary paper roll
12: primary paper roll
15: doctor chamber
16: flexographic coater
17: flexographic coater
20: slitter
21: winding drum
22: paper roll
60: folding mechanism
63: multi-ply-sheet from a secondary paper roll
65: conveyor
67: multi-ply formed band
112: friction member
215: doctor chamber
216: flexographic coater
222: secondary paper roll
223: tertiary paper roll
300: rotary interfolder

The invention claimed is:

1. A two-ply tissue paper having two outer side surfaces to which a chemical agent has been continuously applied, said chemical agent comprising from 70% to 90% polyol by weight and having a viscosity of from about 50 mPa·s to about 400 mPa·s at 40° C. at the time it is applied, said two-ply tissue paper further comprising: a chemical agent content for each one of said two side surfaces of from 3.0 to 5.0 g/m$^2$; a weight per each ply constituting the two-ply tissue paper including said chemical agent of from 11 g/m$^2$ to 16 g/m$^2$; a sheet thickness for said two-ply tissue paper of from 100 um to 140 um; and a coefficient of static friction of the two-ply tissue is 0.55 to 0.65, wherein said coefficient of static friction is measured by following step (A) to (D): (A) a segment of the two ply tissue paper is separated into two single ply sheets of tissue paper and the one of said single-ply sheets of tissue paper is attached to an acrylic plate so that the surface of said single-ply sheet of tissue paper that had been an outer side surface of said two ply tissue paper faces outside; (B) a second segment of the two ply tissue paper is wound on a weight of 100 g while a two ply structure is maintained and the weight is placed on the one ply tissue paper attached to the acrylic plate; (C) an angle at which the weight slides and falls is measured by inclining the acrylic plate; and (D) the angle is measured eight times in total, four times between MD direction of the one ply tissue paper and MD direction of the two ply tissue paper and four times between CD direction of the one ply tissue paper and CD direction of the two ply tissue paper so that an average angle is calculated, and a tangent value thereof is set as the static friction coefficient, and said two-ply tissue paper is a blowing nose tissue paper contained within a box for storage and retrieval of said tissue paper.

2. The two-ply tissue paper according to claim 1, wherein said chemical agent has a moisture content of from 1% to 15 wt %.

3. The two-ply tissue paper according to claim 1, wherein said two-ply tissue paper has a moisture ratio of from 10.0 to 13.0%.

4. The two-ply tissue paper according to claim 1, wherein said two-ply tissue paper has a dry tensile strength in the CD direction of from 80 to 120 cN/25 mm and a wet tensile strength in the CD direction of from 33 to 60 cN/25 mm.

5. The two-ply tissue paper according to claim 1, wherein said two-ply tissue paper has a softness of from 0.9 cN/100 mm to 1.01 cN/100 mm.

6. The two-ply tissue paper according to claim 1, wherein said chemical agent comprises from 74% to 85% glycerin by weight.

7. The two-ply tissue paper according to claim 6, wherein said chemical agent further comprises from 0.1% to 10% sorbitol by weight.

8. A method of manufacturing the two-ply tissue paper of claim 1 comprising: continuously applying the chemical agent to the two outer side surfaces of said two-ply tissue paper wherein said chemical agent comprises from about 70% to about 90% polyol by weight and has a viscosity at the time it is applied of from about 50 mPa·s to about 400 mPa·s at 40° C.

9. The method according to claim 8, wherein said chemical agent has a moisture content of from 1% to 15 wt %.

10. The method according to claim 8, wherein said chemical agent comprises from 74% to 85% glycerin by weight.

11. The method according to claim 10, wherein said chemical agent further comprises from 0.1% to 10% sorbitol by weight.

* * * * *